United States Patent [19]
Perlowski

[11] 3,990,054
[45] Nov. 2, 1976

[54] MICROPROGRAM ORGANIZATION TECHNIQUES

[75] Inventor: Andrew A. Perlowski, Minnetonka, Minn.

[73] Assignee: Honeywell Inc., Minneapolis, Minn.

[22] Filed: Nov. 5, 1974

[21] Appl. No.: 521,022

[52] U.S. Cl. .............................. 340/172.5
[51] Int. Cl.² ............... G06F 9/06; G06F 13/00
[58] Field of Search .................. 340/172.5

[56] References Cited
UNITED STATES PATENTS

| | | | |
|---|---|---|---|
| 3,325,788 | 6/1967 | Hackl | 340/172.5 |
| 3,391,394 | 7/1968 | Ottaway | 340/172.5 |
| 3,736,563 | 5/1973 | Beckinger | 340/172.5 |
| 3,766,532 | 10/1973 | Liebel | 340/172.5 |
| 3,781,823 | 12/1973 | Senese | 340/172.5 |
| 3,800,293 | 3/1974 | Enger | 340/172.5 |
| 3,839,705 | 10/1974 | Davis | 340/172.5 |
| 3,886,523 | 5/1975 | Ferguson | 340/172.5 |

*Primary Examiner*—Gareth D. Shaw
*Assistant Examiner*—James D. Thomas
*Attorney, Agent, or Firm*—Allegretti, Newitt, Witcoff & McAndrews

[57] ABSTRACT

The disclosure describes improved microprogramming apparatus for a data processor. The improved apparatus includes a translating diode matrix which translates the operation code of a macroinstruction being executed into a predetermined address of a microinstruction stored in a read-only memory. For each operation code being executed, the translating diode matrix is capable of reading two different microinstructions held at two different addresses. This technique enables the sharing of microinstructions by macroinstructions requiring common execution techniques. Logic circuitry is also provided to enable conditional branching of the microprogram.

8 Claims, 2 Drawing Figures

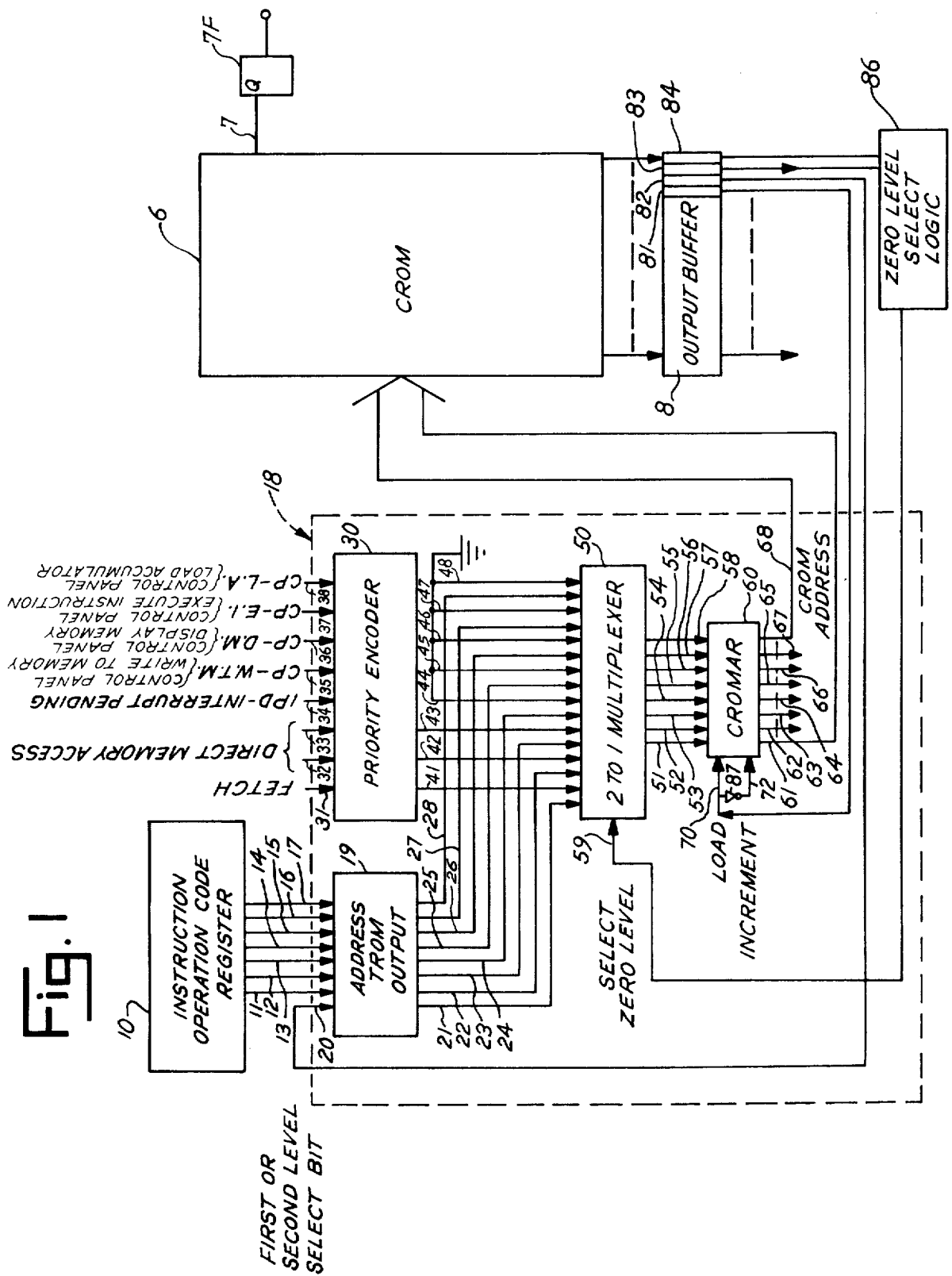

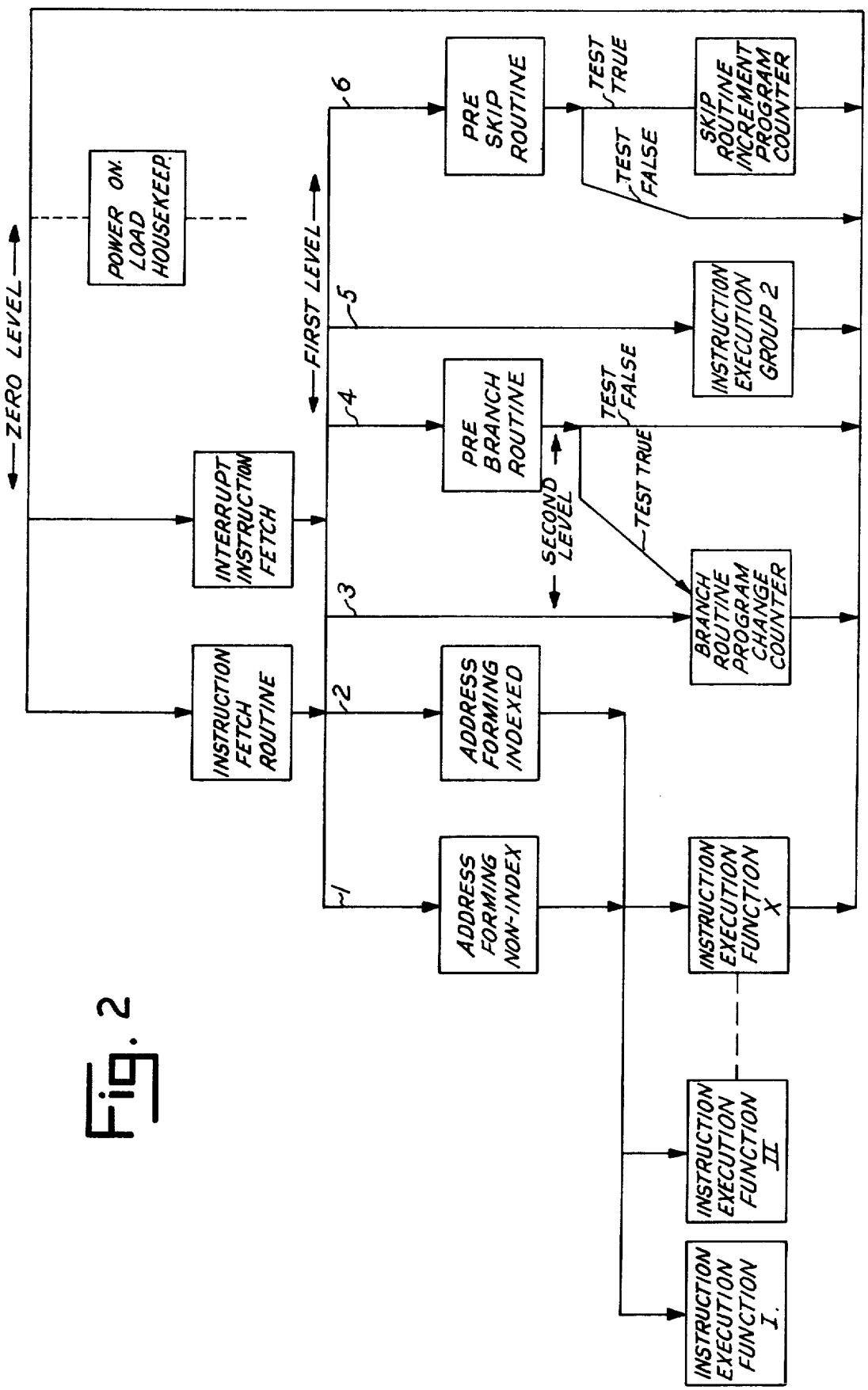

MICROPROGRAM ORGANIZATION TECHNIQUES

The invention herein described was made in the course of or under a contract or subcontract thereunder with the U.S. Government, Department of the Air Force.

BACKGROUND AND SUMMARY OF THE INVENTION

This invention relates to data processing and more particularly relates to apparatus for carrying out a microprogram within a data processor.

In most data processing systems, each machine operation is made up of a sequence of microprogram of microinstructions, such as transfers from memory to control or arithmetic registers, or vice-versa, and such as transfers from one register to another. In these systems, it has been common to use a series or sequence of microinstructions to carry out each machine operation as defined by a macroinstruction. The microinstructions are generally stored in a control read-only memory (CROM). Control logic enables a microinstruction or a group of microinstructions stored in CROM to execute a program memory instruction or macroinstruction. The CROM contents are similar to a group of subroutines which are called by the macroinstructions. Since a different series of microinstructions is stored for each different macroinstruction, the proper entry point to the CROM must be determined by the state of the data processor or the macroinstruction to be executed.

In conventional data processors, the operation code of the macroinstruction is used as a direct address of the CROM. This technique assumes that a routine in the microprogram is executed from an entry point corresponding to an instruction operation code and that every operation code has a unique entry point. Once an entry point is established, a number of words must be reserved in CROM for instruction execution. This number may be as high as eight, and if the processor uses a seven bit operation code (including the address) the total number of micro words would be 1024 ($8 \times 2^7$). According to this technique, the address of CROM would be represented by the notation (XXXXXXX 000)$_2$ in which the upper seven bits (i.e., the X's) directly correspond to the operation code. Because not all macroinstructions require eight micro words for execution, the CROM would contain blank words and would result in inefficient utilization.

Accordingly, it is the principal object of the present invention to provide microprogramming apparatus in which blank words in the memory storing the microinstructions are avoided or minimized. The applicant achieves this result by using a translator to convert each operation code to any required address in the CROM.

Since the function of the microprogram is to control the internal architecture of the processor, the microprogram must recognize the current state of the processor and take action corresponding to a particular state. Since come states have a higher priority than others, the microprogram also must be capable of recognizing and selecting the state with the highest priority. Accordingly, another object of the present invention is to provide improved apparatus for quickly and efficiently enabling the microprogram to select the macroinstruction having the highest priority for execution.

One of the principal purposes of the microprogram is to fetch and execute macroinstructions stored in the program memory of the processor. The fetching and executing of some macroinstructions may involve 40-50 microinstructions with various addressing modes, such as direct or indirect. Many of the macroinstructions require identical or closely related microinstructions for their execution. If the operation code of the macroinstruction is used as a direct address for CROM, the CROM must store the same microinstructions in connection with each different macroinstruction, thereby resulting in needless duplication and waste of CROM capacity.

Accordingly, it is another object of the present invention to provide improved apparatus which allows microinstruction sharing during the execution of different macroinstructions. The result can be achieved by dividing the requisite microinstructions into two different levels. On the first level, the microinstructions relating to the fetching of the operand called for by a macroinstruction are grouped. On the second level, the microinstructions relating to the arithmetic function applied to the operand are grouped. This organization can be achieved by providing a translator which generates two distinct addresses for each operation code stored in the instruction register. The first address points to the first level group of microinstructions and the second address points to the second level group of microinstructions. The microinstructions within the group can be sequentially executed by incrementing an address register for the CROM.

According to another feature of the invention, the microinstruction routines requiring branching can be performed by a translator such as a multiple address generator, capable of generating two distinct addresses for each operation code of a macroinstruction being executed.

DESCRIPTION OF THE DRAWINGS

These and other objects and advantages and features of the present invention will hereafter appear in connection with the accompanying drawings wherein:

FIG. 1 is a block diagram schematic drawing of a preferred form of microprogram apparatus made in accordance with the present invention; and FIG. 2 is a block diagram illustrating the manner in which the microinstructions are organized by the apparatus shown in FIG. 1.

DESCRIPTION OF THE PREFERRED EMBODIMENT

Referring to FIG. 1, a preferred form of microprogramming apparatus made in accordance with the present invention comprises a control read-only memory (CROM) 6 which stores microinstructions at predetermined addresses and reads out the macroinstructions on demand into an output buffer register 8 in response to a read out signal applied to a conductor 7 by a control flipflop 7F.

The microprogramming apparatus also includes an instruction register 10 capable of storing a seven bit operation code corresponding to at least a portion of the macroinstruction to be executed. The operation code is transmitted over conductors 11-17 to addressing circuitry 18 which selects a particular microinstruction stored in CROM 6 and enables flipflop 7F to read the microinstruction into output buffer 8.

Addressing circuitry 18 comprises a translating read-only memory (TROM) 19 which takes the form of a diode matrix having eight inputs bits. Seven of the eight input bits are provided over conductors 11-17 and the eighth input bit is provided by a level input conductor 20. TROM 19 translates the operation code stored in register 10 into two different addresses for CROM 6 depending on the state of input 20. The addresses from TROM 19 are transmitted over conductors 21-28.

Addressing circuitry 18 also comprises a priority encoder 30 which receives input information over input conductors 31-38. If any of conductors 35-38 is switched to a logical one state, the data processor used in connection with the described microprogramming apparatus is said to be in a control panel execution state in which the microprogram stored in CROM 6 is required to perform a specified function. If conductor 34 is switched to a logical one state, the data processor is in an interrupt service state in which the microprogram stored in CROM 6 is expected to perform an interrupt service routine. If conductors 32, 33 are switched to logical one states, the data processor is given direct memory access to CROM 6, that is, the control section of the processor is enabled to perform a direct memory access function between the I/O and memory. If conductor 31 is switched to a logical one state, the processor is in a normal state of operation in which a macroinstruction of the processor program is being fetched from memory and executed in accordance with an operation code.

The foregoing states have a priority associated with their occurrence and are treated as priority coded interrupts to the microprogramming apparatus. Control panel conductors 35-38 have the highest priority, the interrupt pending conductor 34 has the next highest priority, direct memory access conductors 32, 33 have the third highest priority and fetch conductor 31 has the lowest priority.

Encoder 30 encodes the binary signals appearing on input conductors 31-38 into an eight bit code appearing on output conductors 41-48. The bits represented by conductors 44-48 are connected to ground potential and are maintained at a constant zero state. The states of conductors 41-43 vary depending on the logical states represented by input conductors 31-38.

The output conductors from TROM 19 and encoder 30 are connected to a two-to-one multiplexer 50 which transmits the signals appearing on input conductors 21-28 to output conductors 51-58, respectively, if a select input 59 is in a logical zero state and which transmits the signals appearing on input conductors 41-48 to output conductors 51-58, respectively, if select input 59 is in a logical one state. Multiplexers of the foregoing type as well-known and can be implemented by standard logic gates.

The output from multiplexer 50 loads a control read-only memory address register (CROMAR) 60 which is a loadable up-counter having output conductors 61-68 connected to CROM 6. A load input 70 loads the signals appearing on conductors 51-58 into register 60, and an increment input 72 increases the numerical value of the signal stored in register 60 by one integer. The load/increment functions are exclusive. This is maintained by an inverter 87.

Inputs 20, 59, 70 and 72 of addressing circuitry 18 are controlled by output stages 81-84 of output buffer register 8. Output stages 83 and 84 are connected through zero level select logic circuitry 86 which will be described in more detail later.

Referring to FIG. 2, the circuitry described in FIG. 1 operates as follows.

The zero level entry into CROM 6 depends on the state of a data processor used in connection with the described microprogramming apparatus. Switching of any one of encoder input lines 31-38 from a zero to a one state transmits a corresponding microinstruction address through multiplexer 50 into CROMAR 60. That is, during the next request for a new address from the priority encoder 30, an address corresponding to an appropriate routine will be passed through multiplexer 50 into CROMAR 60. For example, if conductors 35-38 are switched sequentially from a zero to a one state, an address is entered into CROMAR 60 which will result in the following respective functions:

(1) writing to memory from the control panel (conductor 35);

(2) displaying from memory under instructions from the control panel (conductor 36);

(3) executing an instruction from the control panel (conductor 37); and (4) loading the accumulator from the panel (conductor 38).

If conductor 34 is switched from a zero to a one state, an address is generated by encoder 30 and is entered into CROMAR 60 which begins an interrupt service routine stored in CROM 6. Likewise, if either conductor 32 or 33 is switched from a zero to a one state, direct access is provided to CROM 6 from the data processor by performing a memory access function. If conductor 31 is switched from zero to a one state, an address is generated by encoder 30 and is entered into CROMAR 60 which initiates a routine that fetches a macroinstruction to be executed from the main memory of the data processor. Each of the functions represented by conductors 31-38 corresponds to a different routine of microinstructions stored in CROM 6 and each results in a distinct address being loaded into CROMAR 60.

Assuming conductor 31 is switched from a zero to a one state, the instruction fetch routine microinstructions (FIG. 2) are sequentially read out of CROM 6 into output buffer 8. In each microinstruction of the fetch routine, the bit located in storage element 81 is a logical zero so that CROMAR 60 is incremented through input 72 at the end of each microinstruction. As a result, a new microinstruction is sequentially loaded into output buffer 8 until the routine is completed. The fetch routine transfers the operation code of the macroinstruction being fetched to register 10 and the fetch routine is completed. In the last microinstruction of the fetch routine, the bit located in storage element 81 of buffer 8 is a logical one, so that a loading of a new address into CROMAR 60 will be accomplished. At the same time, the bit located in storage element 83 selects the conductors 21-28 as inputs to CROMAR 60 via the 2 to 1 multiplexer 50. The bit located in storage element 82 which is also input 20 to TROM 19 is switched to a logical zero state, thus indicating that a first level microinstruction selection is required. In summary, the value of the microinstruction read into buffer 8 is decoded to determine the level of microinstruction selection.

As shown in FIG. 2, the first level selection can follow any one of 6 paths. Paths 1 and 2 relate to arithmetic or logical functions requiring two phases: (1) address forming and operand fetching, and (2) execution on the fetched operand. If the operation code stored in register 10 requires an arithmetic or a logical function, such as addition, subtraction, logical OR or exclusive OR, the operand of the function must be addressed and fetched regardless of the function to be performed. Even if the operation code requires different arithmetic functions, such as addition and subtraction, the addressing modes of the operands required for the arithmetic operation may be identical, so that the same operand fetching routine can be used for both arithmetic functions. In such a case, the first level entry address into CROM 6 can be identical for operation codes requiring different arithmetic functions to be performed.

When the address forming phase is completed, a second level microinstruction selection is required in order to perform the execution phase. In some cases, different operation codes requiring the same arithmetic function, but using different addressing techniques to obtain the requisite operands, can use identical microinstruction routines in order to perform the execution phase. In such cases, the second level entry address into CROM 6 can be identical for operation codes requiring different address forming (level) techniques to obtain the requisite operands. Examples of such operation codes are shown in the following Table 1.

TABLE 1

| Required Operation Code Function | | Level Entry Example | | |
|---|---|---|---|---|
| | | Operation Code | 1st Level CROM Address | 2nd Level CROM Address |
| ADD | Direct, page zero | (010)₈ | (023)₈ | (121)₈ |
| ADD | Direct, PC Relative | (011)₈ | (027)₈ | (121)₈ |
| ADD | Indirect, page zero | (012)₈ | (031)₈ | (121)₈ |
| ADD | Indirect, PC Relative | (013)₈ | (035)₈ | (121)₈ |
| SUB | Direct, page zero | (020)₈ | (023)₈ | (125)₈ |
| SUB | Direct, PC Relative | (021)₈ | (027)₈ | (125)₈ |
| SUB | Indirect, page zero | (022)₈ | (031)₈ | (125)₈ |
| SUB | Indirect, PC Relative | (023)₈ | (035)₈ | (125)₈ |

Referring to Table 1, if operation code 010 is stored in registerr 10, an add function is to be performed on the operand which is directly addressed at page zero of main memory. As previously explained, the last microinstruction of the fetch routine switches input 20 to a zero state. As a result, TROM 19 produces a first level CROM address 023 which is transmitted through multiplexer 50 and stored in CROMAR 60. Address 023 is the address of the first microinstruction in a routine stored in CROM 6 for fetching the operand from page zero of main memory. Additional microinstructions in the fetching routine are read out into output buffer 8 by incrementing CROMAR 60. The last microinstruction in the fetching routine switches select input 20 to a one state, thereby causing TROM 19 to generate second level CROM address 121. Address 121 is the first address in the microinstruction routine stored in CROM 6 which performs the add function on the operand fetched by the first level routine beginning at address 023. In order to perform the add function, CROMAR 60 is incremented until the last microinstruction of the add routine which completes the execution of the operation code is stored in register 8. The last microinstruction enters bits in storage elements 83 and 84 which switch select input 59 into a one state, thereby returning control of the CROM 6 address to encoder 30.

As shown in FIG. 2, the concept of using the first and second level CROM addresses generated by TROM 19 can be applied to a wide variety of microinstruction routines. As previously pointed out, the instruction fetch routine is common to all macroinstructions, and its function is to load a new operation code corresponding to the macroinstruction into instruction register 10 and to update the program counter of the data processor (not shown).

At the end of the fetch routine, TROM 19 generates a first level CROM address corresponding to the operation code stored in register 10. As shown in FIG. 2, the first and second level addressed may follow any one of six major paths which are based on the type of instruction being executed.

Path One

The instructions that take Path One are those having an operand address which is nonindexed. The common feature of these instructions is the preparation of the operand based on the addressing mode. After completion of the address forming, select input 20 is switched to a one state so that a second level address is generated which reads out the first microinstruction of a routine based on the operations performed. After the second level routine is completed, select input 59 is switched to a one state so that zero level entry is initiated.

Path Two

Instructions which take Path Two are those in which the operand address is indexed. The common quality of these instructions is the address forming routine. Following the execution of the address forming routine, the second level instruction is generated as described in connection with Path One.

Path Three

The only instruction which relates to Path Three is a branch unconditional instruction. There are four different routines within the branch routine program change counter block because the different addressing modes, but the final result of all the routines is a change in the program counter of the data processor (not shown).

Path Four

Path Four is followed by conditional branch instructions which must perform a test of an indicator before the program counter can be changed. This function is accomplished by a microinstruction routine represented by the prebranch block, and the results of the test performed by the routine are used to determine the next level of entry (i.e., the next address stored in CROMAR 60). If the test for the indicator is true, a second level address is generated by TROM 19, whereas if the test for the indicator is false, select input 59 is switched to a one state so that a zero level address is initiated.

Path Five

Path Five is a catch-all which is followed by all instructions having no common features.

Path Six

Path Six is followed by the skip indicator instruction. This instruction is peculiar in the way it handles the program counter and therefore requires a separate path. A preskip microinstruction routine, represented by the preskip block, tests the indicator. If the indicator test is true, a second level address is generated by TROM 19 which initiates a skip microinstruction routine that increments the program counter. If the indicator test is false, input 59 is switched to a one state so that zero level entry and a zero level address are initiated.

Generation of the zero level, first level and second level addresses is controlled by inputs 20, 59 and 72. These inputs, in turn, are controlled by storage elements 81–84 in output buffer 8 and by zero level select logic 86. Zero level select logic 86 controls the operation of select input 59 in the manner indicated in Table 2:

The design of such logic would be obvious to those skilled in the art based on the information given in Table 2. As shown in Table 2, the last four bits of each microinstruction stored in output buffer 8 (which controls storage elements 81–84), provided all the information necessary to achieve the zero, first, and second level addresses indicated in FIG. 2. One advantage of this control technique is that branching does not require address storage in the microinstructions, but depends only on the proper switching of inputs 20, 59, 70 and 72 to transmit the proper level address to CROMAR 60.

An example set of microinstructions for a digital data computer is shown in Table 3. The right hand column of Table 3 entitled PATH indicates the basic instruction paths previously indicated by FIG. 2. The bit format of the microinstruction identified in Table 3 is shown in Table 4. The definitions of the microinstruction bit shown in Table 4 are provided in Table 5. The coding of specific microinstructions and the showing of microcode is shown in Table 6.

TABLE 2

| Output Element 81 | Output Element 82 | Output Element 83 | Output Element 84 | State of Input 70 | State of Input 72 | State of Input 20 | State of Input 59 | Function Performed |
|---|---|---|---|---|---|---|---|---|
| 0 | — | — | — | 0 | 1 | — | — | Increment CROMAR 60 (next sequential microinstruction to be executed) |
| 1 | — | 1 | 0 | 1 | 0 | — | 1 | Load CROMAR 60 with zero level address |
| 1 | 0 | 0 | 0 | 1 | 0 | 0 | 0 | Load CROMAR 60 with first level address |
| 1 | 1 | 0 | 0 | 1 | 0 | 1 | 0 | Load CROMAR 60 with second level address |
| 1 | 0 or 1 | 0 | 1 | 1 | 0 | 0 or 1 | 1 (if test is false) | Load CROMAR 60 with zero level address if test is false, otherwise load CROMAR 60 with address having level specified by state of TROM input 20 |

TABLE 3

EXAMPLE INSTRUCTION SET

| MNEMONIC | INSTRUCTION FUNCTION | INSTRUCTION BIT 0 1 2 3 4 5 6 7 8 9 10 11 12 13 14 15 | COND CODES | PATH |
|---|---|---|---|---|
| WFI | WAIT FOR INTERRUPT | | | 5 |
| LDA | LOAD ACCUMULATOR FROM MEMORY | | P,N,Z | 1 |
| STA | STORE ACCUMULATOR IN MEMORY | | | 1 |
| ADD | ADD MEMORY TO ACCUMULATOR | | C,P,N,Z | 1 |
| SUB | SUBTRACT MEMORY FROM ACCUMULATOR | | C,P,N,Z | 1 |
| LOR | LOGICAL OR MEMORY AND ACCUMULATOR | | P,N,Z | 1 |
| XOR | EXCLUSIVE OR MEMORY AND ACCUMULATOR | | P,N,Z | 1 |
| AND | LOGICAL AND MEMORY AND ACCUMULATOR | | P,N,Z | 1 |
| JMP | JUMP UNCONDITIONAL | | | 3 |
| JTS | JUMP TO SUBROUTINE | | | 4 |
| JTI | JUMP TO INTERRUPT SUBROUTINE | OP CODE  DIRECT/INDIRECT PROGRAM COUNTER/BASE REGISTER  DISPLACEMENT | | 4 |
| BON | BRANCH ON NEGATIVE ACCUMULATOR | | | 4 |
| BOP | BRANCH ON POSITIVE ACCUMULATOR | | | 4 |
| BOZ | BRANCH ON ZERO INDICATOR | | | 4 |
| INC | INCREMENT MEMORY | | | 1 |
| LCA | LOAD CPU ADDRESS FOR DMA | | | 1 |
| LWC | LOAD WORD COUNT FOR DMA | | | 1 |
| LIR | LOAD IOP ADDRESS-TRANSFER TO IOP | | | 1 |
| LIW | LOAD IOP ADDRESS-TRANSFER TO CPU | | | 1 |
| DIB | DECREMENT INDEX, BRANCH IF NOT ZERO | | | 4 |
| LDI | LOAD ACCUMULATOR - POST INDEXED | | P,N,Z, | 2 |
| STI | STORE ACCUMULATOR - POST INDEXED | | | 2 |
| ADI | ADD TO ACCUMULATOR - POST INDEXED | | C,P,N,Z | 2 |
| JMI | JUMP UNCONDITIONAL - POST INDEXED | | | 5 |
| NOP | NO OPERATION | | | 5 |
| SBM0 | SUBSTITUTE BYTE 0 IN MEMORY | | | 5 |
| SBM1 | SUBSTITUTE BYTE 1 IN MEMORY | | | 5 |
| SBM2 | SUBSTITUTE BYTE 2 IN MEMORY | | | 5 |
| SBM3 | SUBSTITUTE BYTE 3 IN MEMORY | | | 5 |
| SBA0 | SUBSTITUTE BYTE 0 IN ACCUMULATOR | | P,N,Z | 5 |
| SBA1 | SUBSTITUTE BYTE 1 IN ACCUMULATOR | | P,N,Z | 5 |
| SBA2 | SUBSTITUTE BYTE 2 IN ACCUMULATOR | | P,N,Z | 5 |
| SBA3 | SUBSTITUTE BYTE 3 IN ACCUMULATOR | | P,N,Z | 5 |
| SAR | SHIFT ARITHMETIC RIGHT | | P,N,Z | 5 |
| SAL | SHIFT ARITHMETIC LEFT | | P,N,Z | 5 |
| SLR | SHIFT LOGICAL RIGHT | NO. OF SHIFTS | P,N,Z | 5 |

TABLE 3-continued

EXAMPLE INSTRUCTION SET

| MNEMONIC | INSTRUCTION FUNCTION | INSTRUCTION BIT 0 1 2 3 4 5 6 7 8 9 10 11 12 13 14 15 | COND CODES | PA TH |
|---|---|---|---|---|
| SLL | SHIFT LOGICAL LEFT | | P,N,Z | 5 |
| SRR | SHIFT ROTATE RIGHT | | P,N,Z | 5 |
| SRL | SHIFT ROTATE LEFT | | P,N,Z | 5 |
| SBT | SINGLE BIT TEST | BIT POSITION | Z | 5 |
| SBS | SINGLE BIT SET | | P,N,Z | 5 |
| SBR | SINGLE BIT RESET | | P,N,Z | 5 |
| XIN | EXECUTE INPUT | ADDRESS FUNCTION | P,N,Z | 5 |
| XOT | EXECUTE OUTPUT | | | 5 |
| CTA | CONTROL MEMORY TO ACCUMULATOR | CM | P,N,Z | 5 |
| ATC | ACCUMULATOR TO CONTROL MEMORY | ADDRESS | | 5 |
| LII | LOAD INDEX IMMEDIATE | CONSTANT | | 5 |
| SIN | SKIP IF INDICATOR NOT SET | INDICATORS | | 6 |
| CLA | CLEAR ACCUMULATOR | | P,N,Z | 5 |
| OCA | ONE'S COMPLEMENT ACCUMULATOR | | P,N,Z | 5 |
| COM | TWO'S COMPLEMENT ACCUMULATOR | | P,N,Z | 5 |
| RFS | RETURN FROM SUBROUTINE | | | 5 |
| RFI | RETURN FROM INTERRUPT SUBROUTINE | | | 5 |
| EIN | ENABLE INTERRUPTS | | | 5 |
| DIN | DISABLE INTERRUPTS | | | 5 |

TABLE 4

MICROINSTRUCTION BIT FORMAT

| | | | | | | | | | |
|---|---|---|---|---|---|---|---|---|---|
| SHIFT ACC | 26 | | MM | 0 | WAIT INTR. | 40 | | MM | 14 |
| 2 × 1 CTRL | 27 | | ALU | 1 | DMA READ | 41 | | WRC | 15 |
| ½ WORD | 28 | | ACC | 2 | DMA WRITE | 42 | | CPU AR | 16 |
| ALU CODE | 29 | | DMAI | 3 | WAIT DMA | 43 | DESTINATION | DMAO | 17 |
| ALU CODE | 30 | SOURCE | CST | 4 | I/O STROBE | 44 | | OUT | 18 |
| ALU CODE | 31 | | IN | 5 | CLEAR A | 45 | | FAR | 19 |
| ALU CODE | 32 | | INTR | 6 | CLEAR B | 46 | | IR | 20 |
| ALU MODE | 33 | | CM | 7 | | 47 | | CM CODE | 21 |
| CARRY IN | 34 | | MAR | 8 | LEVEL CTRL | 48 | | CM CODE | 22 |
| C.C.STORE | 35 | | A | 9 | LEVEL CTRL | 49 | | CM CODE | 23 |
| C.C. RESTORE | 36 | | B | 10 | LEVEL CTRL | 50 | | CM CODE | 24 |
| C.C. SAMPLE | 37 | DESTINATION | CM | 11 | LEVEL CTRL | 51 | | CM CODE | 25 |
| DIS. INTR. | 38 | | ACC | 12 | | | | | |
| EN. INTR. | 39 | | ACCB | 13 | | | | | |

TABLE 5

MICROINSTRUCTION BIT DEFINITION

| Bit | | Function |
|---|---|---|
| 0 | MM | Enable memory data to the bus |
| 1 | ALU | Enable arithmetic and logic unit output to the bus |
| 2 | ACC | Enable accumulator data to the bus |
| 3 | DMAI | Enable DMA input data to the bus |
| 4 | CST | Enable constant generator data to the bus |
| 5 | IN | Enable I/O input data to the bus |
| 6 | INTR | Enable interrupt address to the bus |
| 7 | CM | Enable control memory data to the bus |
| 8 | MAR | Load memory address register with bus data |
| 9 | A | Load A register in arithmetic and logic unit with bus data |
| 10 | B | Load B register in arithmetic and logic unit with bus data |
| 11 | CM | Load control memory with bus data |
| 12 | ACC | Load accumulator with bus data |
| 13 | ACCB | Load accumulator with bus data, use byte load control |
| 14 | MM | Load memory with bus data |
| 15 | WCR | Load word count register with bus data |
| 16 | CPUAR | Load CPU address register with bus data |
| 17 | DMAO | Load DMA output register with bus data |
| 18 | OUT | Enable bus to I/O output bus |
| 19 | FAR | Load function and address register with bus data |
| 20 | IR | Load instruction register with bus data |
| 21–24 | CM code | 0    use instruction bits 7, 8, 9 to address control memory |
| | | 000    program counter |
| | | 001    Index register |
| | | 010    Pointer register |
| | | 011    Base register |
| | | 100    Temp A |
| | | 101    Temp B |
| | | 110    Temp C |
| | | 111    Temp D |
| 25 | SPARE | |
| 26 | SHIFT ACC | Perform shift cycle in the accumulator |
| 27 | 2×1 CTRL | Concatenate A and B registers in ALU |
| 28 | ½ word | Configure the ALU for a 16 bit operation |
| 29–33 | ALU code | Function to be performed by the ALU |
| | ALU mode | ex., add, and, or ...... |

TABLE 5-continued

MICROINSTRUCTION BIT DEFINITION

| Bit | | Function |
|---|---|---|
| 34 | Carry IN | Carry in condition to the ALU |
| 35 | CC STORE | Store condition codes in the shadow register |
| 36 | CC Restore | Restore condition codes from the shadow register |
| 37 | CC SAMPLE | Sample condition of data on the bus and update condition codes |
| 38 | DIS INTR | Disable interrupts |
| 39 | EN INTR | Enable interrupts |
| 40 | WAIT INTR | Wait for interrupt, halt execution of microinstructions until interrupt occurs |
| 41 | DMA READ | Initiate DMA memory read |
| 42 | DMA WRITE | Initiate DMA memory write |
| 43 | WAIT DMA | Wait for DMA Memory transfer |
| 44 | I/O STROBE | Generate I/O strobe |
| 45 | Clear A | Clear A register in ALU |
| 46 | Clear B | Clear B register in ALU |
| 47 | SPARE | |
| 48–51 | LEVEL CTRL | Level control |

TABLE 6

MICROCODE (1)

| | Source | Destination | C.M. Address | CLEAR A | CLEAR B | SHIFT ACC | 2x1 CTRL | 1/2 WORD | ALU Code | ALU MODE | CARRY IN | C.C. STORE | C.C. RESTORE | C.C. SAMPLE | INTR. DIS. | INTR. EN. | INTR. WAIT | DMA READ | DMA WRITE | DMA WAIT | I/O STROBE | Level Control |
|---|---|---|---|---|---|---|---|---|---|---|---|---|---|---|---|---|---|---|---|---|---|---|
| Zero Level Entry | | | | | | | | | | | | | | | | | | | | | | |
| FETCH | CM | MAR,A | PC | | | | | | | | | | | | | | | | | | | Increment |
| | MM | IR,B | | | | | | | | | | | | | | | | | | | | Increment |
| | ALU | CM | PC | | | | | 1 | F=A | A | 1 | | | | | | | | | | | First |
| INTERRUPT FETCH | INTR | MAR,A | | | | | | | | | | | | | | | | | | | | Increment |
| | MM | IR,B | | | | | | | | | | | | | | | | | | | | First |
| Address Forming Non-Indexed | | | | | | | | | | | | | | | | | | | | | | |
| DIRECT-BASE | ALU | MAR | | | | | 1 | A 1 | F=B | L | | | | | | | | | | | | Second |
| DIRECT-P.C. REL | ALU | MAR | | | | | | A 1 | F=B | L | | | | | | | | | | | | Second |
| IND-BASE | ALU | MAR | | | | | 1 | A 1 | F=B | L | | | | | | | | | | | | Increment |
| | MM | B | | | | | | | | | | | | | | | | | | | | Increment |
| | ALU | MAR | | | | | | B 1 | F=B | L | | | | | | | | | | | | Second |
| IND-P.C. REL | ALU | MAR | | | | | | A 1 | F=B | L | | | | | | | | | | | | Increment |
| | MM | B | | | | | | | | | | | | | | | | | | | | Increment |
| | ALU | MAR | | | | | | B 1 | F=B | L | | | | | | | | | | | | Second |
| Instruction Execution-Group 1 | | | | | | | | | | | | | | | | | | | | | | |
| LD | MM | ACC | | | | | | | | | | | | | | | | | | | 1 | Zero |
| TA | ACC | MM | | | | | | | | | | | | | | | | | | | | Zero |
| ADD | MM | B | | | | | | | | | | | | | | | | | | | | Increment |
| | ACC | A | | | | | | | | | | | | | | | | | | | | Increment |
| | ALU | ACC | | | | | | B 0 | F=A plus B | A | 0 | | | | | | | | | | 1 | Zero |
| SUB | MM | B | | | | | | | | | | | | | | | | | | | | Increment |
| | ACC | A | | | | | | | | | | | | | | | | | | | | Increment |
| | ALU | ACC | | | | | | B 0 | F=A minus B–1 | A | 1 | | | | | | | | | | 1 | Zero |
| LOR | MM | B | | | | | | | | | | | | | | | | | | | | Increment |
| | ACC | A | | | | | | | | | | | | | | | | | | | | Increment |
| | ALU | ACC | | | | | | B 0 | F=A+B | L | | | | | | | | | | | 1 | Zero |
| XOR | MM | B | | | | | | | | | | | | | | | | | | | | Increment |
| | ACC | A | | | | | | | | | | | | | | | | | | | | Increment |
| | ALU | ACC | | | | | | B 0 | F=A⊕B | L | | | | | | | | | | | 1 | Zero |

MICROCODE (2)

| | Source | Destination | C.M. Address | | | | | | ALU Code | ALU MODE | CARRY IN | | | | | | | | | | | Level Control |
|---|---|---|---|---|---|---|---|---|---|---|---|---|---|---|---|---|---|---|---|---|---|---|
| AND | MM | B | | | | | | | | | | | | | | | | | | | | Increment |
| | ACC | A | | | | | | | | | | | | | | | | | | | | Increment |
| | ALU | ACC | | | | | | | B 0 | F=A.B | L | | | | | | | | | | 1 | Zero |
| INC | MM | B | | | | | 1 | | | | | | | | | | | | | | | Increment |
| | ALU | MM | | | | | | | B 0 | F=A plus B | A | 1 | | | | | | | | | | | Zero |
| LCA | MM | CPUAR | | | | | | | | | | | | | | | | | | | | Zero |
| LWC | MM | WCR | | | | | | | | | | | | | | | | | | | | Zero |
| LIR | MM | CM | TEMP | | | | | | | | | | | | | | | | | | 1 | Increment |
| REENTER | CM | MAR,A | TEMP | | | | 1 | | | | | | | | | | | | | | | Increment |
| | ALU | CM | TEMP | | | | | | B 1 | F=A plus B | A | 1 | | | | | | | | | 1 | Increment |
| | DMAI | MM | | | | | | | | | | | | | | | | | | | 1 | Zero |
| LIW | MM | CM | TEMP | | | | | | | | | | | | | | | | | | | Increment |
| | CM | MAR,A | TEMP | | | | 1 | | | | | | | | | | | | | | | Increment |
| | ALU | CM | TEMP | | | | | | B 1 | F=A plus B | A | 1 | | | | | | | | | | Increment |
| | MM | DMAO | | | | | | | | | | | | | | | | | | | 1 | Increment |
| REENTER | CM | MAR,A | TEMP | | | | 1 | | | | | | | | | | | | | | | Increment |
| | ALU | CM | TEMP | | | | | | B 1 | F=A plus B | A | 1 | | | | | | | | | 1 | Increment |
| | MM | DMAO | | | | | | | | | | | | | | | | | | | | Zero |
| Address Forming Indexed | | | | | | | | | | | | | | | | | | | | | | |
| DIRECT-BASE | ALU | CM | TEMP | | | | 1 | A 1 | F=B | L | | | | | | | | | | | | Increment |
| | CM | A | TEMP | | | | | | | | | | | | | | | | | | | Increment |
| | CM | B | INDEX | | | | | | | | | | | | | | | | | | | Increment |
| | ALU | MAR | | | | | | B 1 | F=A plus B | A | 0 | | | | | | | | | | | Second |

TABLE 6-continued

| | | | | | | | | | |
|---|---|---|---|---|---|---|---|---|---|
| DIRECT-P.C. REL | ALU | CM | TEMP | | A 1 | F=B | L | | Increment |
| | CM | A | TEMP | | | | | | Increment |
| | CM | B | INDEX | | | | | | Increment |
| | ALU | MAR | | | B 1 | F=A plus B | A 0 | | Second |
| IND-BASE | ALU | MAR | | 1 | A 1 | F=B | L | | Increment |
| | MM | A | | | | | | | Increment |
| | CM | B | INDEX | | | | | | Increment |
| | ALU | MAR | | | B 1 | F=A plus B | A 0 | | Second |

NOTE:
The ALU field is used to specify the test. The test logic is activated from the level control.

MICROCODE (3)

| | | | | | | | | | |
|---|---|---|---|---|---|---|---|---|---|
| IND-P.C. REL | ALU | MAR | | | A 1 | F=B | L | | Increment |
| | MM | A | | | | | | | Increment |
| | CM | B | INDEX | | | | | | Increment |
| | ALU | MAR | | | B 1 | F=A plus B | A 0 | | Second |
| Branch | | | | | | | | | |
| DIRECT-BASE | ALU | CM | PC | 1 | A 1 | F=B | L | | Zero |
| DIRECT-P.C. REL | ALU | CM | PC | | A 1 | F=B | L | | Zero |
| IND-BASE | ALU | MAR | | 1 | A 1 | F=B | L | | Increment |
| | MM | CM | PC | | | | | | Zero |
| IND-P.C. REL | ALU | MAR | | | A 1 | F=B | L | | Increment |
| | MM | CM | PC | | | | | | Zero |
| Pre-Branch | | | | | | | | | |
| JTS | ALU | CM | TEMP | | 1 | F=A | L | | Increment |
| | CM | A | PTR | | | | | | Increment |
| | ALU | MAR,CM | PTR | | 1 | F=A | A 1 | | Increment |
| | CM | MM | PC | | | | | | Increment |
| | CM | A | TEMP | | | | | | Second |
| JTI | ALU | CM | TEMP | | 1 | F=A | L | 1 | 1 | Increment |
| | CM | A | PTR | | | | | | Increment |
| | ALU | MAR,CM | PTR | | 1 | F=A | A 1 | | Increment |
| | CM | MM | PC | | | | | | Increment |
| | CM | A | TEMP | | | | | | Second |
| DIB | ALU | CM | TEMP | | 1 | F=A | L | | Increment |
| | CM | A | INDEX | | | | | | Increment |
| | ALU | CM | INDEX | | 1 | F=A minus 1 | A 0 | 1 | Increment |
| | CM | A | TEMP | | | TEST O | | | Condition |
| | | | | | | | | | Second |
| BON | | | | | | TEST N | | | Condition |
| | | | | | | | | | Second |
| BOP | | | | | | TEST P | | | Condition |
| | | | | | | | | | Second |
| BOZ | | | | | | TEST O | | | Condition |
| | | | | | | | | | Second |

MICROCODE (4)

Instruction
Execution-Group 2

| | | | | | | | | | |
|---|---|---|---|---|---|---|---|---|---|
| JMI-DIR BASE | ALU | CM | TEMP | 1 | A 1 | F=B | L | | Increment |
| | CM | A | TEMP | | | | | | Increment |
| | CM | B | INDEX | | | | | | Increment |
| | ALU | CM | PC | | B 1 | F=A plus B | A 0 | | Zero |
| JMI-DIR P.C.REL | ALU | CM | TEMP | | A 1 | F=B | L | | Increment |
| | CM | A | TEMP | | | | | | Increment |
| | CM | B | INDEX | | | | | | Increment |
| | ALU | CM | PC | | B 1 | F=A plus B | A 0 | | Zero |
| JMI-IND BASE | ALU | MAR | | 1 | A 1 | F=B | L | | Increment |
| | MM | A | | | | | | | Increment |
| | CM | B | INDEX | | | | | | Increment |
| | ALU | CM | PC | | B 1 | F=A plus B | A 0 | | Zero |
| JMI-Ind P.C.REL | ALU | MAR | | | A 1 | F=B | L | | Increment |
| | MM | A | | | | | | | Increment |
| | CM | B | INDEX | | | | | | Increment |
| | ALU | CM | PC | | B 1 | F=A plus B | A 0 | | Zero |
| NOP | | | | | | | | | Zero |
| SBA | ALU | MAR | | 1 | A 1 | F=B | L 0 | | Increment |
| | MM | ACC B | | | | | | | Increment |
| | ACC | | | | | | | 1 | Zero |
| SBM | ALU | MAR | | 1 | A 1 | F=B | L | | Increment |
| | ACC | A | | | | | | | Increment |
| | MM | ACC | | | | | | | Increment |
| | ALU | ACC B | | | | | | | Increment |
| | ACC | MM | | | | | | | Increment |
| | ALU | ACC | | | | F=A | L | | Zero |
| SAR, SAL | | | | | | | | | |
| SRL, SLL | | | | | 1 | | | 1 | |
| SRR, SLR | ACC | | | | | | | | Zero |

MICROCODE (5)

| | | | | | | | | | |
|---|---|---|---|---|---|---|---|---|---|
| SBT | ACC | A | | | | | | | Increment |
| | CST | B | | | | | | | Increment |
| | ALU | | | | B | F=A.B | L | 1 | Zero |
| SBS | ACC | A | | | | | | | Increment |
| | CST | B | | | | | | | Increment |
| | ALU | ACC | | | B | F=A+B | L | 1 | Zero |
| SBR | ACC | A | | | | | | | Increment |
| | CST | B | | | | | | | Increment |
| | ALU | ACC | | | B | F=A.$\bar{B}$ | L | 1 | Zero |
| XIN | ALU | FAR | | | | B | F=B | L | Increment |
| | | | | | | | | | Increment |
| | | | | | | | | | Increment |
| | IN | ACC | | | | | | 1 | 1 | Increment |
| | | | | 1 | | | | | 1 | Increment |
| | ALU | FAR | | | | | F=A | L | Zero |
| XOT | ALU | FAR | | | | B | F=B | L | Increment |

TABLE 6-continued

| | | | | | | | | | | |
|---|---|---|---|---|---|---|---|---|---|---|
| | ACC | OUT | | | | | | | | Increment |
| | | | | | | | | | | Increment |
| | | | | | | | | | | Increment |
| | | | | 1 | | | | | 1 | Increment |
| | | | | | | | | | 1 | Increment |
| | ALU | FAR | | | | F=A | L | | | Zero |

NOTE:
The above instructions contain blank words because the I/O timing has not been finalized.

| | | | | | | | | | | |
|---|---|---|---|---|---|---|---|---|---|---|
| | | | | | | | | 1 | | Zero |
| CTA | CM | ACC | USE 7,8 | | | | | | | Zero |
| ATC | ACC | CM | USE 7,8 | | | | | | | Zero |
| JI | ALU | CM | INDEX | 1 | A | F=B | L | | | Zero |
| CLA | ALU | ACC | | 1 | | F=A | L | | | Zero |
| OCA | ACC | A | | | | | | | | Increment |
| | ALU | ACC | | | | F=Ā | L | 1 | | Zero |
| COM | ACC | B | | 1 | | | | | | Increment |
| | ALU | ACC | | | B | OF=A minus B−1 | A | 1 | 1 | Zero |

MICROCODE (6)

| | | | | | | | | | | |
|---|---|---|---|---|---|---|---|---|---|---|
| WFI | | | | | | | | 1 | | Zero |
| RFS | CM | MAR,A | PTR | | | | | | | Increment |
| | ALU | CM | PTR | 1 | | F=A minus 1 | A 0 | | | Increment |
| | MM | CM | PC | | | | | | | Zero |
| RFI | CM | MAR,A | PTR | | | | | 1 | 1 | Increment |
| | ALU | CM | PTR | 1 | | F=A minus 1 | A 0 | | | Increment |
| | MM | CM | PC | | | | | | | Zero |
| EIN | | | | | | | | 1 | | Zero |
| DIN | | | | | | | | | 1 | Zero |
| Pre-Skip | | | | | | TEST IND. | | | | Conditional Second Increment |
| Skip | CM | A | PC | | | | | | | Zero |
| | ALU | CM | PC | 1 | | F=A | A 1 | | | |

Those skilled in the art will recognize that the preferred embodiment described above may be altered and modified without departing from the true spirit and scope of the invention as defined in the accompanying claims.

What is claimed is:

1. In a data processor capable of processing data in accordance with a first macroinstruction and a second macroinstruction, improved apparatus for generating at least a first microinstruction and for generating at least a second microinstruction for use in combination with the first microinstruction for executing the second macroinstruction, comprising:
microinstruction memory means for storing the first microinstruction at a first address and the second microinstruction at a second address;
output means for storing the microinstructions read from the microinstruction memory means and for generating a first output signal in response to the absence of the first microinstruction from the output means and for generating a second output signal in response to the presence of the first microinstruction in the output means;
instruction register means for storing during a first time period a first operation code signal corresponding to at least a portion of the first macroinstruction and for storing during a second time period a second operation code signal corresponding to at least a portion of the second macroinstruction; and
addressing means responsive during a first time period to the first operation code signal and the first output signal for reading the first microinstruction from the first address into the output means so that the execution of the first macroinstruction is enabled, and responsive during a second time period later than the first time period to the second operation code signal and the first output signal for reading the first microinstruction from the first address into the output means and responsive to the second operation code signal and the second output signal for reading the second microinstruction from the second address into the output means so that the execution of the second macroinstruction is enabled by the first and second microinstructions, whereby the first microinstruction stored at the first address is used to enable the execution of both the first and second macroinstructions.

2. Apparatus, as claimed in claim 1, wherein the addressing means comprises:
translating means for generating a first address signal corresponding to the first address in response to the combined first operation code signal and first output signal and in response to the combined second operation code signal and first output signal, and for generating a second address signal corresponding to the second address in response to the combined second operation code signal and second output signal;
address register means for storing the first and the second address signals while the first and second microinstructions are being read from the microinstruction memory means; and
means for transmitting the first and second address signals from the translating means to the address register means.

3. Apparatus, as claimed in claim 2, wherein the translating means comprises a diode matrix.

4. Apparatus, as claimed in claim 2, wherein the means for transmitting comprises conductors.

5. Apparatus, as claimed in claim 4, wherein the means for transmitting comprises encoder means for preventing the first and second address signals from being transmitted to the address register means and for transmitting to the address register means a priority address signal corresponding to a data processor instruction having a priority greater than the first and second macroinstructions.

6. In a data processor capable of processing data in accordance with a first macroinstruction and a second macroinstruction, improved apparatus for generating a first microinstruction, a second microinstruction and a third microinstruction used to execute the first macroinstruction and for generating a fourth microinstruction used with the first and second microinstructions to execute the second macroinstruction, comprising:
microinstruction memory means for storing the first microinstruction at a first address, the second microinstruction at a second address, the third microinstruction at a third address and the fourth microinstruction at a fourth address and for reading the microinstructions from the addresses in response to address signals;

output means for storing the microinstructions read from the microinstruction memory means and for sequentially generating a first output signal in response to the absence of the first microinstruction from the output means, for generating a second output signal in response to the presence of the first microinstruction in the output means, and for generating a third output signal in response to the presence of the second microinstruction in the output means;

instruction register means for storing during a first time period a first operation code signal corresponding to at least a portion of the first macroinstruction and for storing during a second time period a second operation code signal corresponding to at least a portion of the second macroinstruction;

translating means for sequentially generating a first address signal corresponding to the first address in response to the combination of the first operation code signal and the first output signal and in response to the combination of the second operation code signal and the first output signal, for generating a third address signal corresponding to the third address in response to the combination of the first operation code signal and the third output signal, and for generating a fourth address signal corresponding to the fourth address in response to the combination of the second operation code signal and the third output signal;

address register means for storing the first address signal and for incrementing the first address signal to form the second address signal in response to the second output signal;

means for conducting said first, third and fourth address signals from the translating means to the address register means; and means for successively transmitting the first, second and third address signals from the address register means to the microinstruction memory means as the first, second and third output signals are successively produced by the output means during the first time period so that the execution of the first macroinstruction is enabled, and for successively transmitting the first, second and fourth address signals to the microinstruction memory means as the first, second and fourth output signals are successively produced by the output means during the second time period so that the execution of the second macroinstruction is enabled.

7. Apparatus, as claimed in claim 6, wherein the translating means comprises a diode matrix.

8. Apparatus, as claimed in claim 7, wherein the means for conducting comprises means for preventing the first, third and fourth address signals from being transmitted to the address register means and for transmitting to the address register means a priority address signal corresponding to a processor instruction having a priority greater than the first and second macroinstructions.

* * * * *